April 12, 1932.  J. H. WILY  1,853,186
TOOL HANDLE CONNECTION
Filed May 19, 1927
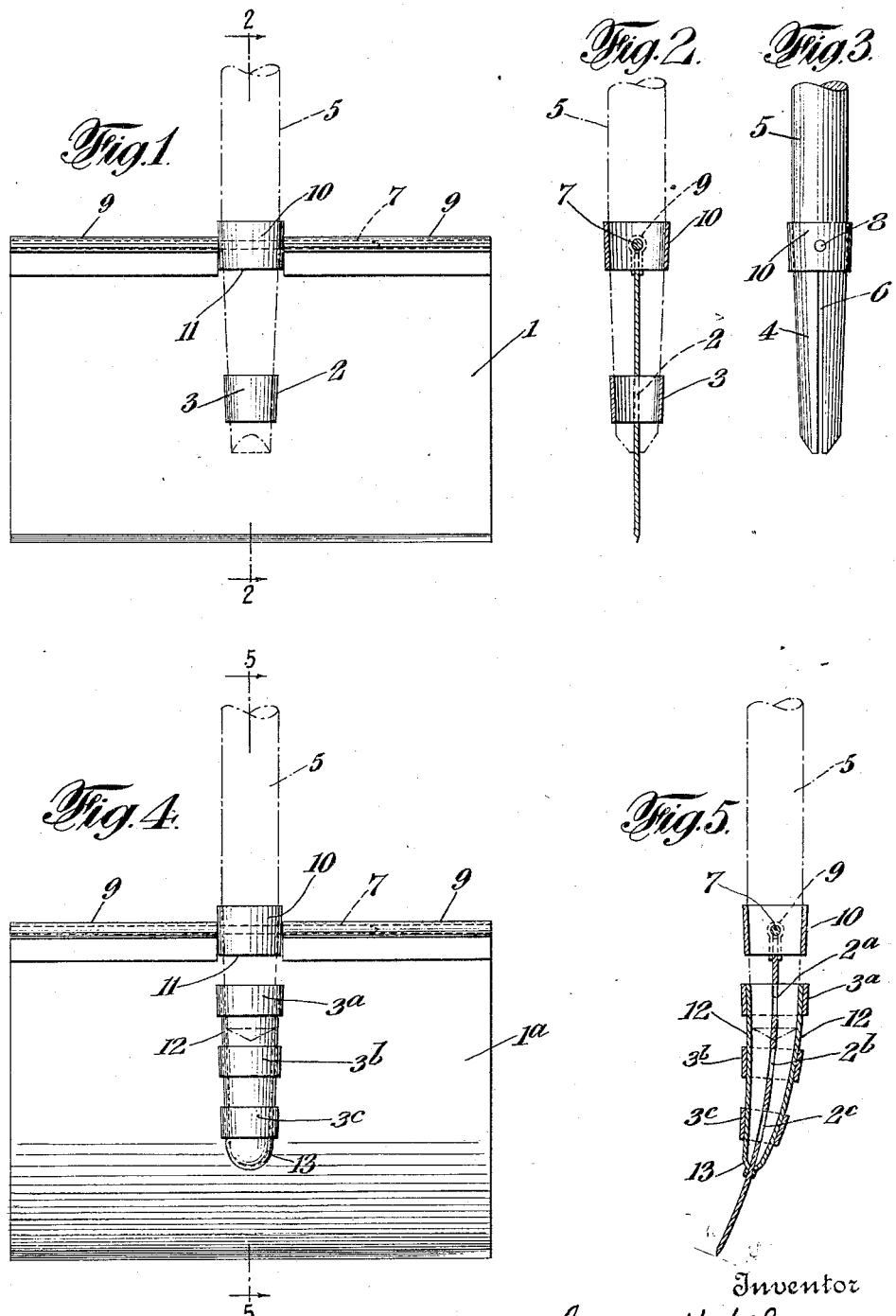
Inventor
James H. Wily
By his Attorneys
Prindle Wright Kralt Bean Patented Apr. 12, 1932

1,853,186

UNITED STATES PATENT OFFICE

JAMES H. WILY, OF BETHLEHEM, PENNSYLVANIA

TOOL HANDLE CONNECTION

Application filed May 19, 1927. Serial No. 192,501.

The invention relates to a handle connection for tools, such as shovels, ice scrapers, sod cutters and similar bladed tools, and is particularly advantageous as applied to tools of the above nature having sheet metal or other substantially plane blades to which it is desired to connect a wooden handle.

The invention aims particularly to provide a handle connection of the above nature which will avoid undue weaknesses in either the blade or the handle, which will be simple in construction and not likely to work loose. Further objects and advantages of the invention will be in part obvious and in part specifically pointed out in the description hereinafter contained which taken in connection with the accompanying drawings, discloses certain simple embodiments thereof; such embodiments, however, are to be considered as merely illustrative of its principles.

In the drawings—

Fig. 1 is a front view of a cutter and handle connected thereto in accordance with the invention, the handle appearing in dotted lines.

Fig. 2 is a central longitudinal section on line 2—2 of Fig. 1.

Fig. 3 is a side view showing the end of the handle detached.

Fig. 4 is a front view showing a somewhat modified form of the invention.

Fig. 5 is a central vertical section taken on line 5—5 of Fig. 4.

In the form of the invention illustrated in Figs. 1 to 3, the tool blade 1 is provided with an opening 2 in which an annular handle holding member 3 is fitted, the holding member 3 being preferably formed entirely separate from the blade and being detachable therefrom. The end portion 4 of the handle 5 is then forced between the annular holding member 3 and the blade in such manner as to be wedged therebetween. Preferably both the member 3 and the handle end portion are tapered as shown in the drawings, so as to make this wedging more effective and hold both the handle and the holding member 3 securely in position.

As shown the end portion 4 of the handle is split by sawing a slot 6 therein, which slot receives the blade 1 when the handle is driven in place while the split end portions engage the holding member 3 on both sides of the blade.

In order to lock the handle adequately in place, the parts above described preferably are used in conjunction with a transverse locking member 7 which passes through a hole 8 in the handle and engages with the rear portion of the blade to prevent the handle from becoming pulled out or otherwise shifted in regard to the blade. As shown the rear portion of the blade is provided with hollow fittings 9 adapted to receive the locking pin 7 for the above purpose. In order to reinforce the handle near the hole 8 I also prefer to provide at this point a metallic ferrule 10 which closely surrounds the handle and receives pin 8, the ferrule fitting in a recess 11 in the rear portion of the blade and preferably serving as a stop to aline the hole 8 with pin 7 when it comes up against the bottom of the recess.

A connection of the above nature reinforces the handle adequately against splitting and is exceedingly simple and rigid, the locking engagement afforded by pin 7 at the rear of the blade serving to insure that the holding member 3 and the end portion of the blade are kept tight.

The embodiment of the invention shown in Figs. 4 and 5 is similar to the one above described as far as a transverse locking attachment at the rear portion of the blade is concerned and accordingly the corresponding parts will not be again described in detail. The construction of the handle of Figs. 4 and 5 is also similar to the one described above in connection with Figs. 1 to 3, the tapered split end of the handle being wedged in place by an annular locking member 3a. In this instance, however, the tool blade 1a is provided with reinforcing members 12 on its opposite sides, these reinforcing members being shown in the form of tapering hollow half-tube sections conforming in curvature to the curvature of the blade and welded or otherwise secured to the blade at their forward ends 13. As shown, the reinforcing members 12 are received between the annular holding member 3a and the end of the handle so that the handle wedges them outwardly against the holding member 3a. A plurality of further openings 2b and 2c may also be provided in the blade which are alined with the opening 2a and annular holding members 3b and 3c may be employed, which taper toward the forward edge of the blade, whereby the reinforcing members 12 are further held in position by the holding members 3b and 3c as above described.

While certain specific forms of the invention have been described it will be obvious that many changes may be made therein without departing from its principles as defined in the appended claims.

I claim:

1. In combination, a tool blade having an opening therein, an annular handle holding member fitting in said opening and a handle having a split end portion receiving the blade, said split end portion being surrounded by said annular member and wedged between the latter and the opposite sides of the blade.

2. In combination, a tool blade having an opening therein, an annular handle holding member having an opening of fixed size received in said opening, a handle having its end portion surrounded by said annular member and wedged between the latter and the blade and a transverse locking member passing through the handle and engaging with the rear portion of the blade to lock the handle in position.

3. In combination, a tool blade having an opening therein, an annular member having an opening of fixed size received in said opening, a blade reinforcing member surrounded by said annular member, and a handle having a tapered end portion wedged between said reinforcing member and the blade to force the reinforcing member outwardly against said annular member.

4. In combination, a tool blade having an opening therein, an annular member having an opening of fixed size received in said opening and reinforcing members lying along opposite sides of the blade, said reinforcing members being enclosed by said annular member, and a handle having a split and tapered end portion receiving the blade and received within said reinforcing members to force the latter outwardly against said annular member.

5. In combination, a tool blade having alined openings therein, annular handle holding members having an opening of fixed size received in said openings and a handle having a tapered end surrounded by said annular members and wedged between the latter and the blade.

6. In combination, a tool blade having alined openings therein, annular members having an opening of fixed size received respectively in said openings, a handle member having a tapered end portion surrounded by certain of said annular members, and a blade reinforcing member alined with said handle member and being also surrounded by certain of said annular members, said handle and reinforcing members being wedged between the annular members and the blade.

7. In combination, a tool blade having an opening therein, an annular handle-holding member having an opening of fixed size received in said opening, a handle having an end portion disposed along one side of the blade, there being another member disposed on the opposite side of the blade and enclosed by said annular member, the end portion of the handle being wedged between the portion of the annular member which encloses it and the blade.

8. In combination, a tool blade having an opening therein, an annular handle-holding member having an opening of fixed size received in said opening, a handle having an end portion disposed along one side of the blade, there being another member disposed on the opposite side of the blade and enclosed by said annular member, the end portion of the handle being wedged between the portion of the annular member which encloses it and the blade, a ferrule surrounding the handle near the rear portion of the blade and a locking member passing through the ferrule, handle and blade to lock the handle in wedged-in position.

9. A blade for a tool and the like provided with a plurality of openings, annular holding members in said openings and reinforcing members attached to the blade at their one end and adapted to be forced against said annular members by a tool handle, said reinforcing members forming an expansible sheath.

10. In combination, a tool blade having a cutaway portion to form a relatively large opening therein, an integral annular handle holding member of substantially the same size as said opening and adapted to be slidably mounted in said opening before the handle is inserted and a handle having a tapered end portion surrounded by said annular member and wedged between the latter and the blade.

In testimony that I claim the foregoing, I have hereunto set my hand this 12th day of May, 1927.

JAMES H. WILY.